(12) United States Patent
Kussel

(10) Patent No.: US 6,978,679 B2
(45) Date of Patent: Dec. 27, 2005

(54) HYDRAULIC PRESSURE SENSOR

(75) Inventor: Willy Kussel, Werne (DE)

(73) Assignee: Tiefenbach Bergbautechnik GmbH, Essen (DE)

( * ) Notice: Subject to any disclaimer, the term of this patent is extended or adjusted under 35 U.S.C. 154(b) by 66 days.

(21) Appl. No.: 10/996,688

(22) Filed: Nov. 24, 2004

(65) Prior Publication Data
US 2005/0092094 A1 May 5, 2005

Related U.S. Application Data

(63) Continuation of application No. PCT/DE03/01652, filed on May 21, 2003.

(30) Foreign Application Priority Data
May 24, 2002 (DE) ............................ 102 23 299

(51) Int. Cl.$^7$ ................................. G01L 7/16
(52) U.S. Cl. ............... 73/744; 73/745; 73/746
(58) Field of Search ............ 73/744–746, 729

(56) References Cited

U.S. PATENT DOCUMENTS 3,744,316 A * 7/1973 Kuzyk ................... 73/745
3,999,431 A * 12/1976 Makarainen ............ 73/745
4,203,384 A * 5/1980 Silverwater .............. 73/744
5,483,835 A 1/1996 Ciolli
6,050,349 A * 4/2000 Rountree et al. ......... 73/744

* cited by examiner

Primary Examiner—William Oen
Assistant Examiner—Alandra Ellington
(74) Attorney, Agent, or Firm—Alston & Bird LLP

(57) ABSTRACT

A hydraulic pressure sensor for measuring the pressure in a hydraulic pressure chamber 1. A reservoir housing 9 is connected to the pressure chamber, and the interior of the housing is divided by a slideable partition 13 which defines a reservoir chamber 8 which is connected to the pressure chamber and a sensor chamber 7 which is connected to a sensor element 5. The partition 13 is constructed as a piston and extends for sliding movement along the walls of the reservoir housing while exerting a frictional force. A spring 11 supports the partition relative to the reservoir housing against the pressure in the reservoir chamber 8. The partition 13 may be constructed as a differential piston, and consist of two or more piston sections 13.1, 13.2, 13.3, which extend independently of one another in a sliding and sealing manner, and mutually support one another by an intermediate spring 14.

13 Claims, 4 Drawing Sheets

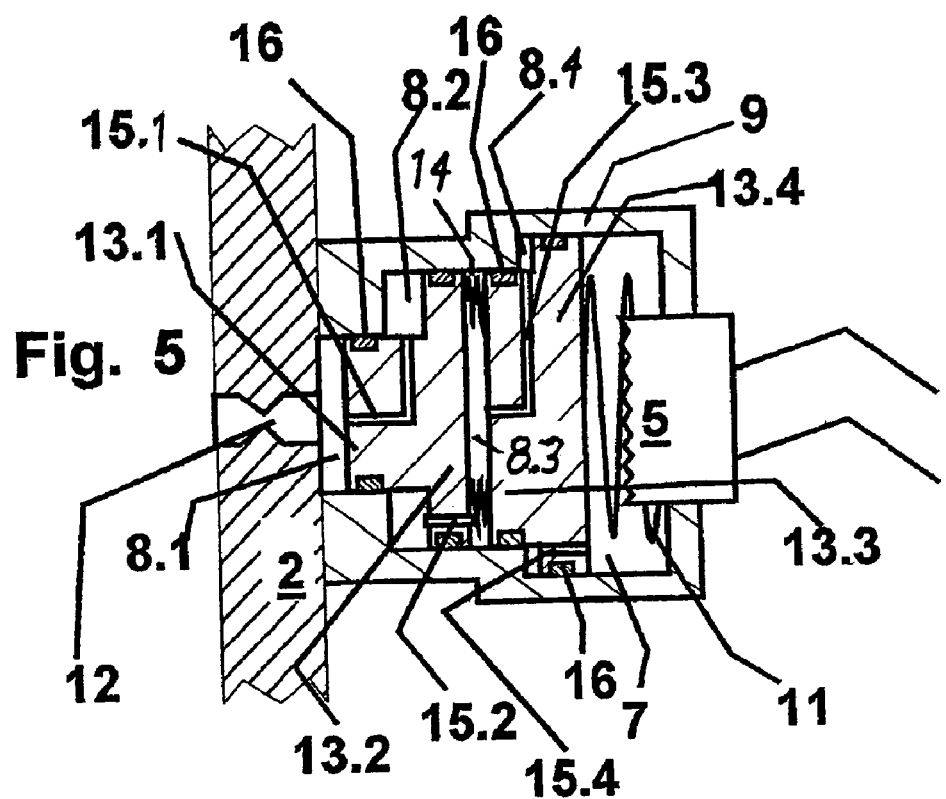
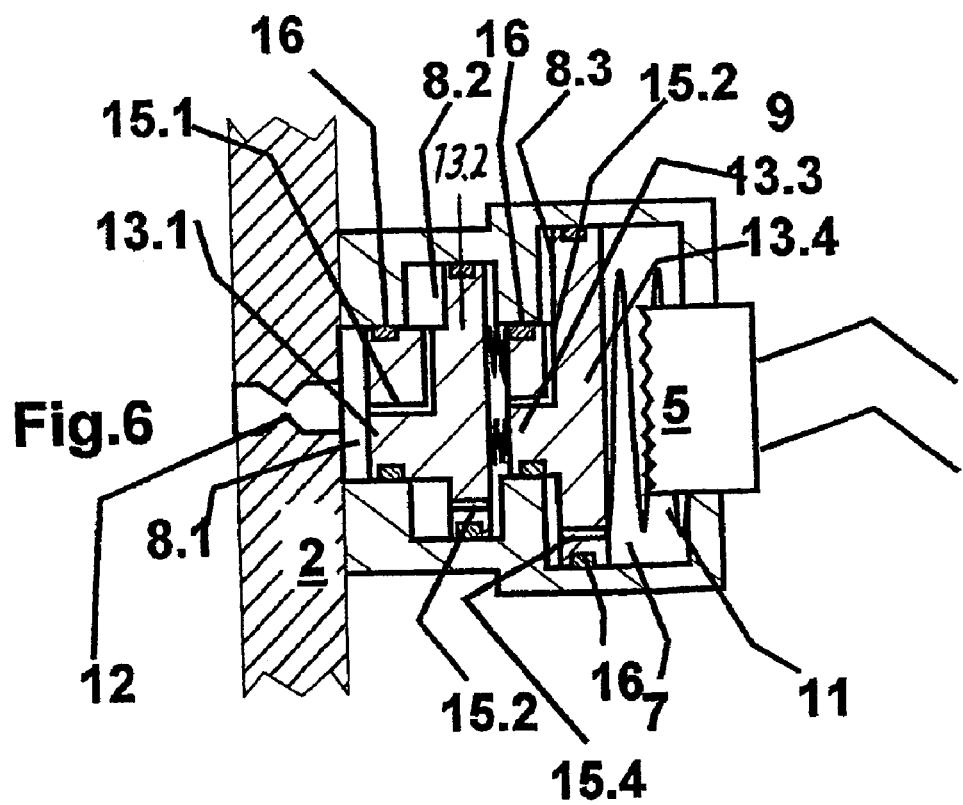

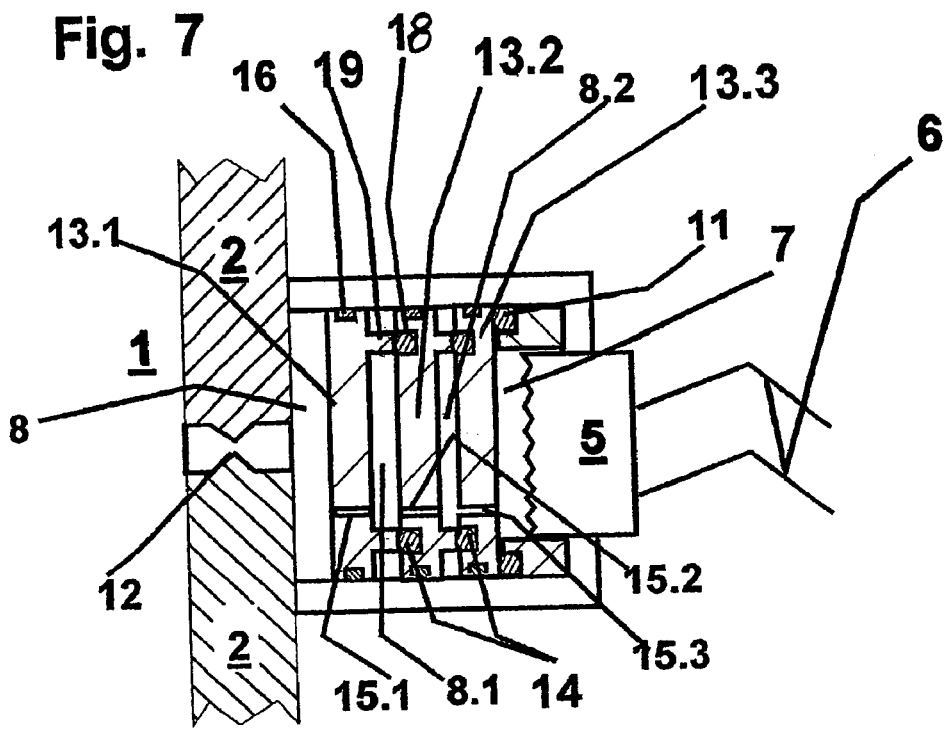

HYDRAULIC PRESSURE SENSOR

CROSS REFERENCE TO RELATED APPLICATION

This is a continuation of international application PCT/DE 03/01652, filed May 21, 2003. The disclosure of said application is incorporated herein by reference.

BACKGROUND OF THE INVENTION

The present invention relates to a hydraulic pressure sensor for measuring the pressure in a hydraulic pressure chamber.

When measuring the pressure, in particular in hydraulic consumers, for example, hydraulic working cylinders, there arises the problem that great pressure fluctuations may lead to damage or misalignment of the calibrated pressure sensor. This applies in particular to pressure sensors, namely in the case of sensor elements, which comprise a diaphragm that is deformable under the pressure of the sensor chamber, and to which electronic components are applied by gluing, vapor deposition or otherwise for representing an electric bridge.

It is therefore common practice to accommodate such sensor elements in a sensor chamber, which connects to the pressure chamber in a pressure conducting manner, but is spatially separated from the pressure chamber such that the sensor element is protected.

SUMMARY OF THE INVENTION

As a specific example for protecting pressure sensors, in particular against pressure fluctuations, pressure surges, and pressure jumps, it has been proposed to connect the sensor chamber via a hose to the pressure chamber. This hose is made of an elastic material. In this connection, the hose acts as a reservoir, which absorbs and damps sudden pressure fluctuations, pressure surges, and pressure jumps on the one hand by its volume and on other hand by the elasticity of its sidewall. The disadvantage of this measure lies in that the hose connection is susceptible to damage, ageing, and leakage. Furthermore in many cases, it also represents an obstacle. This applies in particular to pressure sensors on working cylinders for development machines in mining, where it is necessary to consider pressures of more than 200 bars with pressure fluctuations and pressure surges of more than 100 bars.

It is accordingly an object of the invention to provide a hydraulic pressure sensor of the described type and which includes an improved construction for permitting measurement of very high pressures without damage or misalignment. Large pressure fluctuations, pressure surges, or jumps of the pressure being measured will likewise have no damaging effects.

The above and other objects and advantages of the invention are achieved by the provision of a reservoir housing which is connected to the pressure chamber, and a partition is mounted in the housing so as to divide the interior of the housing into a reservoir chamber and a sensor chamber. The partition comprises a piston which is mounted in the reservoir housing for sliding movement which generates a frictional force between the piston and the interior wall of the reservoir housing, and a support spring is disposed in the sensor chamber for biasing the piston in a direction toward the reservoir chamber and thus against the pressure of the fluid in the reservoir chamber.

The invention avoids the disadvantages of the prior hose connection as described above. The reservoir housing, which accommodates the reservoir chamber connecting to the pressure chamber and the sensor chamber, may be integrated into the hydraulic machine or be secured to the pressure chamber. Thus between the pressure chamber and the sensor chamber a reservoir is arranged, which connects hydraulically to the pressure chamber via a throttle or nozzle, and mechanically to the other side via the movable partition.

While the partition is arranged in the reservoir housing for sliding movement in the fashion of a piston, it is arranged in such a manner that it is movable only when frictional forces are applied. The flow control effect of the throttle or nozzle, as well as the frictional forces of the partition in the reservoir are adapted to one another such that pressure surges, pressure fluctuations, and pressure jumps in the pressure chamber can be transmitted to the sensor chamber, as much as possible, only without jerk or shock and in an integral behavior. Likewise, sudden pressure changes are thus transmitted into the sensor chamber only in the form of a continuous function, the slope of which can be determined by dimensioning the throttle and by the extent of the frictional forces.

A spring, which is used to support the partition in the reservoir housing, likewise limits the amount of the mechanical pressure transmission, since the spring counteracts the pressure that builds up in the reservoir chamber. In this connection, it is not necessary that the sensor chamber also connect in a fluid conducting manner to the pressure chamber or the reservoir chamber, since the pressure of the reservoir chamber is transmitted to the sensor chamber mechanically, i.e., by the movement of the partition. In this connection, it is presumed that not only the reservoir chamber is filled with the hydraulic medium, but that also the pressure chamber contains the hydraulic medium or another fluid. The latter may be fats or other nonaggressive fluids, in particular when water is used as hydraulic medium, which should be kept away from the sensor element because of its deteriorating effects.

It should however be noted that the pressure chamber and the sensor chamber or, however, the reservoir chamber and the sensor chamber may also be hydraulically connected. This occurs by means of a flow control channel or a nozzle. In this case, the complete pressure equalization between the pressure chamber and the sensor chamber also occurs hydraulically. Preferably, the flow control channel extends between the reservoir chamber and the sensor chamber as a small bore through the partition.

As has previously been described, the invention is also suited for very high pressures and very high pressure fluctuations. This advantage applies in particular to one embodiment of the invention wherein the partition is in the form of a differential piston composed of piston sections of increasing cross section. In this configuration of the invention, the pressure that is mechanically transmitted from the partition to the sensor chamber upon occurrence of a pressure surge is relatively low in accordance with the ratio of the small piston surface that is exposed to the pressure surge, to the large piston surface that faces the sensor chamber. In addition, this compressive force is at least partially absorbed by the frictional force of the partition, which is necessary for overcoming the friction.

The piston sections of the partition that is constructed as a differential piston may axially interconnect as an integral unit, i.e., they may be made in one piece, be screwed together, or be otherwise rigidly joined.

When the piston sections are movable independently of one another, a somewhat different transmission behavior will result. Namely, upon occurrence of a pressure surge, the first differential chamber adjoining the pressure chamber is biased by the pressure surge via the throttle and by the mobility of the first piston section. Thereafter, the pressure developing in the first differential chamber is transmitted and reduced via the second, larger piston section over the entire piston surface. In this case, it is especially advantageous to support the piston sections against one another by means of springs.

The support of the piston sections by means of springs accomplishes that the mechanical pressure transmission is limited by the very small mobility of the partition and the fact that it is partially absorbed on the springs.

As previously pointed out, the absorbing capacity of the pressure sensor depends with respect to pressure jumps, pressure fluctuations, and pressure surges on the size or on the hydraulic resistance of the flow control channels or nozzles, the mechanical resistance of the partition, and the design of the support spring which is used to support the partition stationarily. It is obvious that limitations are set to each of these quantities.

To achieve nonetheless a protection against very high pressure fluctuations, the invention is further developed by the fact that the last piston section, which seals the sensor chamber, is supported in a stationary manner relative the equalizing reservoir by the support spring, and the other piston sections are each supported on the adjacent piston section. Between one another, the piston sections form chamber sections of the reservoir housing, which connect to the pressure chamber via a flow control channel. This flow control channel is preferably arranged in the piston sections, so that in the case of pressure fluctuations, a staggered pressure buildup results from chamber section to chamber section.

The individual piston sections in turn extend for sliding movement in the reservoir housing while exerting a frictional force. In this connection it is also possible to construct individual piston sections as differential pistons, preferably the first piston section adjacent to the pressure chamber, or the following second piston section. In this connection, it should be emphasized that the hydraulic pressure equalization occurs on the partitions that are constructed as differential pistons respectively via a flow control channel between the differential chamber and the subsequent chamber section.

For the purpose of ensuring a robust elastic support of the partition or piston sections, the support spring in the sensor chamber, and/or the intermediate springs positioned between the piston sections, may be formed by rubber or other elastic materials.

More particularly, the intermediate springs may be in the form of a rubber ring which is inserted into an annular groove in the opposing surface of one of the piston sections, and an annular bead that corresponds to the size of the groove is positioned on the opposing surface of the other piston section. This prevents the rubber rings from being damaged as a consequence of the occurring high compressive forces. In other words, the rubber rings are prevented from laterally yielding and from being squeezed under the great force of the pressure being measured.

As aforesaid, the partitions or piston sections of the partition extend along the inside wall of the reservoir housing in a sliding and sealing manner. A suitable seal is provided by a sealing ring arranged in a circumferential groove in the piston. This construction also facilitates the adjustment of the desired frictional forces.

The elastic rings in use for the seal may also have a double function, in that they serve for sealing and exerting sliding frictional forces on the one hand. On the other hand, they are used to support the piston sections. This will apply in particular when the rings have a rectangular or oval cross section, i.e., they are longer in the axial direction than in the radial direction. In this case, the high pressure that develops in the reservoir chamber or in the chamber sections will cause the rings to bulge outward, thereby increasing the frictional forces that are needed for the movement of the partition or piston sections.

BRIEF DESCRIPTION OF THE DRAWINGS

In the following, the invention is further described by means of embodiments shown in the drawings, of which:

FIGS. 3–8 are views similar to FIG. 2 and illustrating other embodiments of the invention.

DETAILED DESCRIPTION OF THE PREFERRED EMBODIMENTS

The following description and the applied numerals will apply to all embodiments, unless express reference is made to special features.

The invention is used for measuring the pressure of hydraulic fluids in hydraulic engines or machines. Preferably, the invention is applied to high pressures of more than 100 bars, since in this case pressure fluctuations have a high absolute value, and therefore tend to damage or misalign the sensor element in particular.

Figure 1:
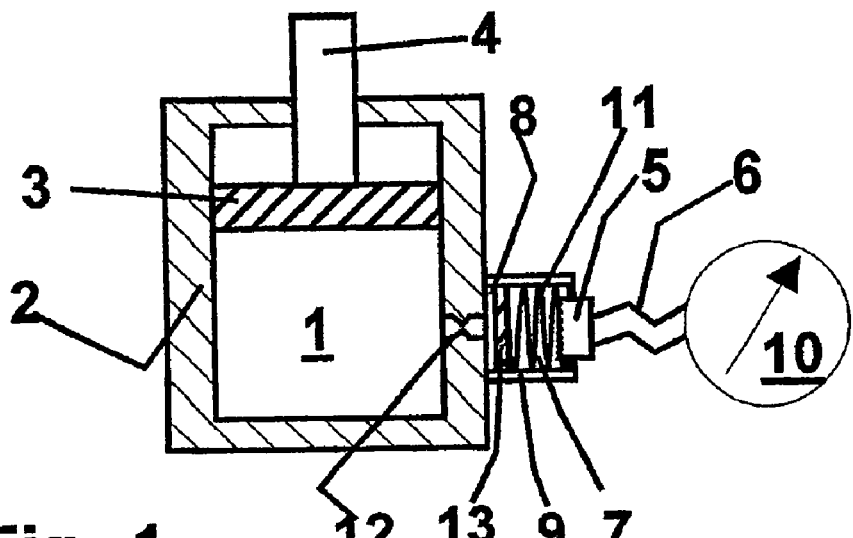
FIG. 1 is a cross sectional view of a hydraulic cylinder with a connected pressure sensor.

FIG. 1 schematically illustrates a hydraulic machine in the form of a cylinder 2 with a piston 3 and a plunger 4. Of this cylinder 2, the further embodiments show each only a wall 2 as well as a nozzle 12, which connects a pressure chamber 1 of the machine to a sensor chamber 7. To this end, a cylindrical equalization reservoir housing 9 is secured to the wall 2 of the cylinder and connects via a nozzle or flow control channel 12 to the pressure chamber 1. The reservoir housing 9 has a pressure resistant rigid outer wall and includes two internal chambers, which are referred to in the present application as the reservoir chamber 8 and the sensor chamber 7.

Figure 2:
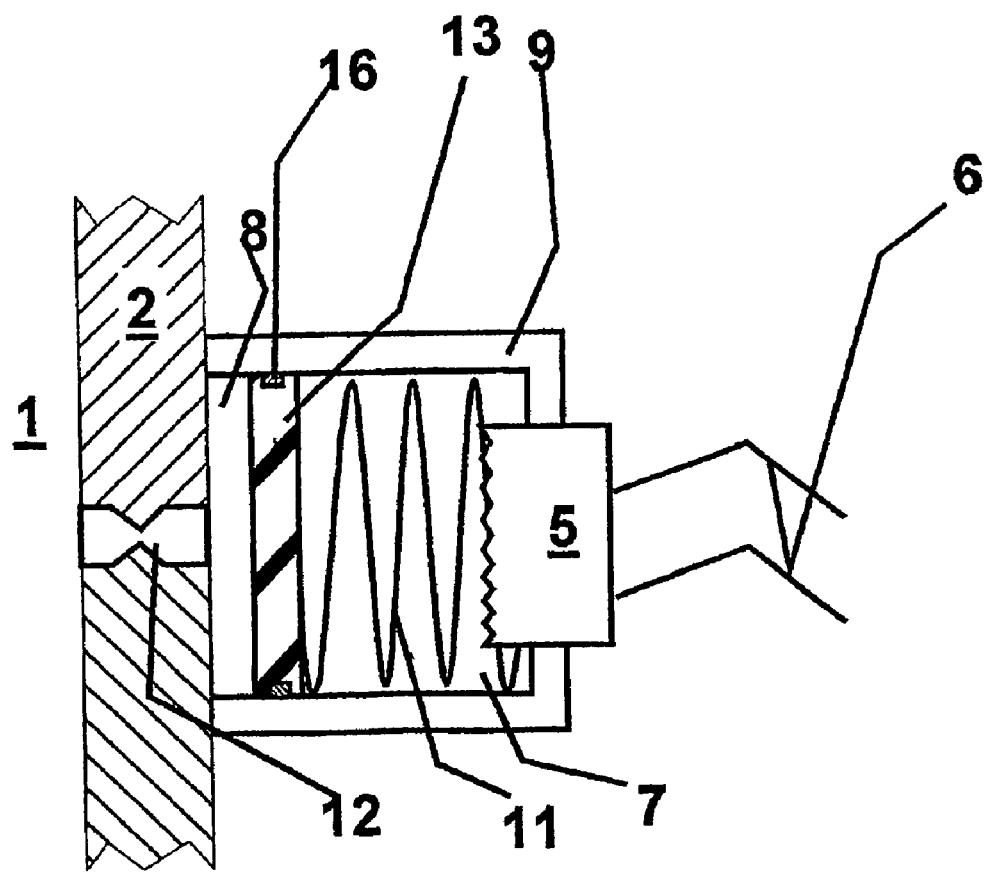
FIG. 2 is an enlarged view of a portion of FIG. 1.

As shown in the drawings, the sensor chamber 7 accommodates a sensor element 5, which is constructed as a diaphragm sensor, primarily when measuring high hydraulic pressures. FIGS. 1 and 2 indicate a diaphragm sensor that is equipped with electronic components, in particular resistors, which are interconnected to a bridge circuit, and which permits measuring differential currents or differential voltages that are representative of the pressure.

The sensor element 5 connects via supply lines 6 to a display unit 10. It should be emphasized that it is not necessary to accommodate the sensor element 5 directly in the sensor chamber 7 of the reservoir housing 9. The technical purpose of the pressure sensor according to the invention will also be attained, when the sensor chamber 7 connects via hydraulic supply lines to the sensor element or a chamber, in which the sensor element is directly arranged.

As described, a partition 13 subdivides the reservoir housing 9 into the reservoir chamber 8 and the sensor chamber 7 that accommodates the sensor element 5, or which hydraulically connects to the sensor element or a chamber that accommodates the sensor element.

The partition 13 is adapted for movement in the cylindrical reservoir housing in the fashion of a piston. A spring 11 supports the partition in the reservoir housing against the pressure in the reservoir chamber 8. On its circumference, a combined friction and sealing ring 16 seals the partition relative to the reservoir housing 9. The sliding properties of the partition 13 relative to the reservoir housing are chosen from a corresponding selection of guides (friction and sealing rings) 16, so that the partition opposes its axial movement with a certain frictional resistance In operation, the pressure in the working chamber 1 of the cylinder 2 is hydraulically transmitted into the reservoir chamber 8 via the flow control channel or nozzle 12. The pressure buildup in the reservoir chamber 8 proceeds with a certain delay because of the flow resistance resulting from the throttle effect of the nozzle 12. The frictional resistance of the partition 13 on the reservoir housing 9 causes a further impediment during the pressure buildup in the sensor chamber 7. This mechanical pressure transmission is additionally reduced by the spring 11 that supports the partition relative the equalizing reservoir, and is operative in the sense of enlarging the sensor chamber 7.

In the past, it has been assumed that the sensor chamber 7 and the reservoir chamber 8 should not be hydraulically connected in a fluid conducting manner. In fact, a connection of this type is unnecessary. However, one has to take into account that as a function of the frictional force which the partition opposes to its axial movement, and that furthermore as a function of the amount of the elastic force of the spring 11, the pressure measured on the pressure sensor 5 does not fully correspond to the pressure in pressure chamber 1. This must be taken into account when calibrating the sensor. At any rate, it is necessary that also the sensor chamber 7 contain a pressure conducting fluid, which need not be the same fluid that is also used as hydraulic fluid. In particular, it will be possible to use oil, glycerin, or a similar inert fluid, when an aggressive medium, such as, for example, water is used as hydraulic medium.

To avoid the pressure variations between the reservoir chamber 8 on the one hand and the sensor chamber 7 on the other, a preferred embodiment provides for arranging a flow control channel between the reservoir chamber 8 and the sensor chamber 7. This flow control channel may be arranged, for example, in the walls of the cylinder 2 and the reservoir housing 9, for example, as a channel with a small cross section that interconnects the reservoir chamber 8 and the sensor chamber 7. However, it is preferred to arrange this flow control channel in the partition. This channel is indicated at 15.1, 15.2 in each of the embodiments illustrated in FIGS. 3–4. In this configuration, the partition causes the mechanical pressure transmission of pressure surges, pressure jumps, and other unsteady pressure characteristics to be impeded or reduced because of its friction on the reservoir housing 9 and because of its elastic support. As a result of the hydraulic connection between the working chamber 1 and the sensor chamber 7, the hydraulic pressure transmission is however time delayed and damped to such an extent that the sensor element 5 is not damaged or misaligned. Rather, the pressure changes are transmitted into the sensor chamber in the form of a continuous function, which has no disadvantageous effect on the sensor and the calibration of the sensor.

FIG. 2 shows an enlarged detail of FIG. 1, namely the pressure equalizing reservoir housing 9 with the sensor element 5, partition 13, support spring 11, and flow control channel 12 that interconnects the pressure chamber 1 and the reservoir chamber 8. A hydraulic connection between the reservoir chamber 8 and the sensor chamber 7 is absent. Thus, the pressure transmission between the reservoir chamber 8 and the sensor chamber 7 occurs only mechanically, i.e., by the movement of the partition 13. In this connection, it should be remarked that both the sensor chamber 7 and the reservoir chamber 8 may be filled with fluid and hermetically sealed, with the exception of the supply via the flow control channel 12. This movement is mechanically damped by the friction of sealing elements 16, and it is also impeded by the bias of spring 11.

Therefore, when calibrating the sensor 5, one will have to take into account that the pressure in the sensor chamber is not totally representative of the pressure in the pressure chamber 1.

Figure 3:
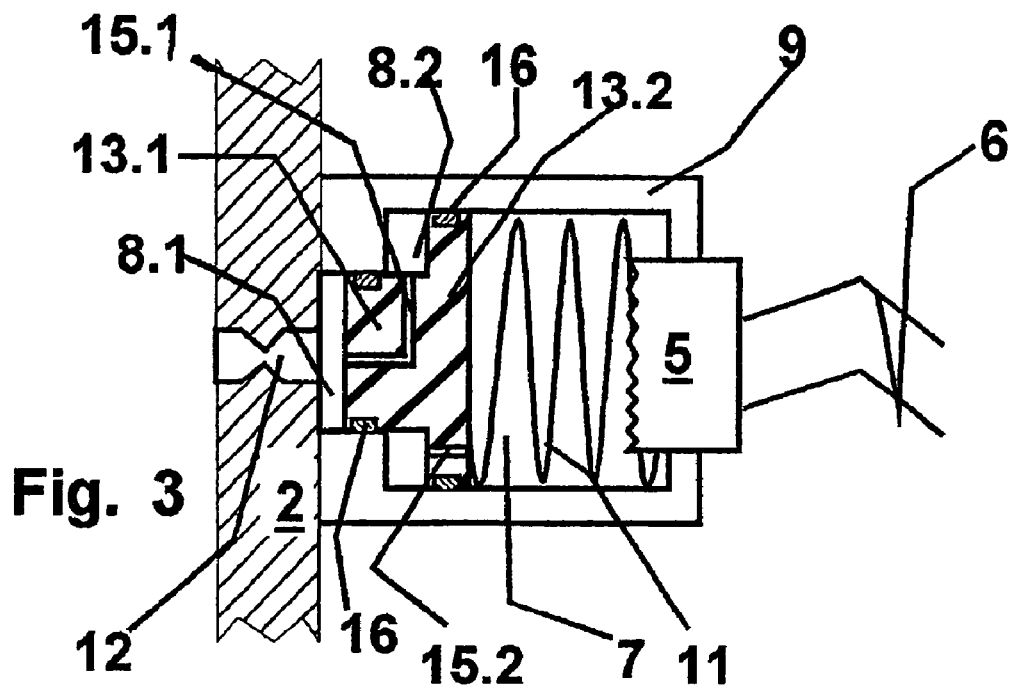
Figure 4:
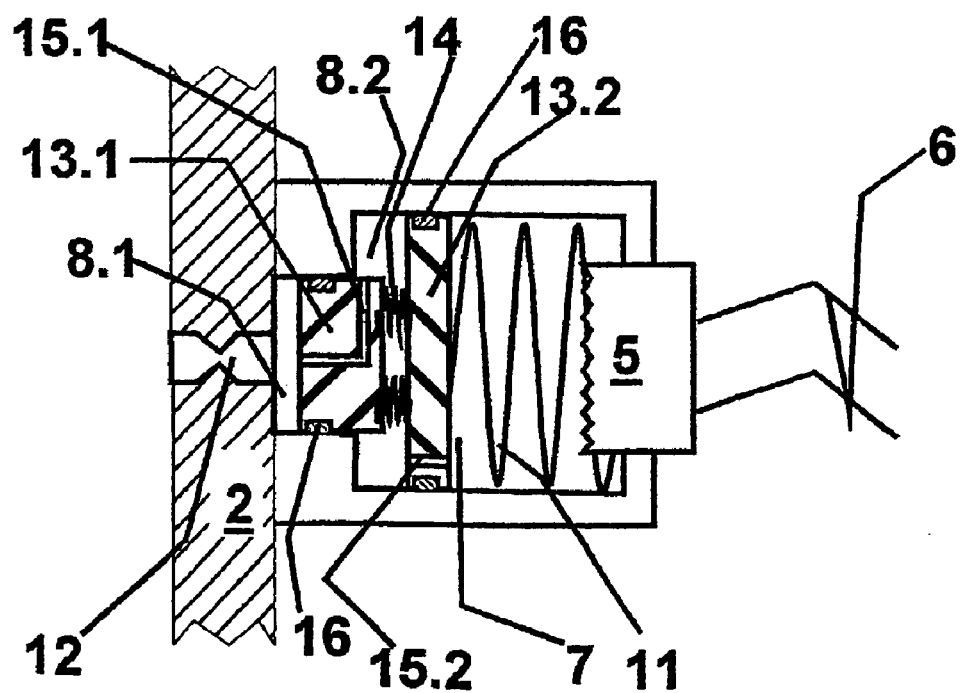

The embodiments of FIGS. 3 and 4 show further possibilities of transmitting pressure. In this case, it is accomplished that the mechanically transmitted pressure is always less than the pressure being measured in the pressure chamber 1. This is realized in that the partition 13 is constructed as a differential piston and consists of a piston section 13.1 with a smaller diameter and a piston section 13.2 with a larger diameter. The wall of the reservoir housing 9 is adapted to the diameters of the piston sections 13.1 and 13.2. As a result, the reservoir chamber 8 is subdivided into a differential chamber 8.1 with a smaller cross sectional area, and a differential chamber 8.2, whose cross sectional area is equal to the area difference of the piston sections 13.1 and 13.2. The differential chamber 8.1 connects to the differential chamber 8.2 via an intermediate channel 15.1 in the small piston section 13.1. The differential chamber 8.2 connects to the sensor chamber 7 via a flow control channel 15.2 in the large piston section 13.2. Also in this instance, it should be remarked that the flow control channels 15.1 and/or in particular 15.2 are not absolutely necessary, so that a merely mechanical pressure transmission would occur.

Otherwise, the last piston section 13.2 of the partition is also supported relative the reservoir housing 9 by means of support spring 11. As aforesaid, also in the present embodiment the mechanical pressure transmission caused by the piston movement is damped by the frictional resistance of the piston and reduced by the biasing force of the support spring 11. In addition, a reduction occurs by the differential piston at the ratio of the cross sectional areas of the piston sections 13.1 and 13.2.

In the embodiment of FIG. 3, the piston is made in one piece, i.e., the sections 13.1 and 13.2 are mechanically joined or integral.

In the embodiment of FIG. 4, the sections 13.1 and 13.2 are not integral. Instead, the sections are supported against each other by intermediate springs 14. The section with the larger cross section 13.2 is furthermore supported relative the reservoir chamber 9 by support spring 11. Likewise in this embodiment, the piston sections include flow control channels, i.e., intermediate channels, with the intermediate channel 15.1 interconnecting the differential chambers 8.1 and 8.2, and the intermediate channel 15.2 connecting the differential chamber 8.2 to the sensor chamber 7. Likewise to this embodiment, the foregoing description applies with respect to the mechanical pressure transmission by the piston movement, with a further absorption occurring by the intermediate springs 14.

In the embodiments of FIGS. 5 and 6, the principle of reducing pressure by differential pistons is applied twice. As a first differential piston use is made of the integral piston sections 13.1 and 13.2. The second differential piston consists of integral piston sections 13.3 and 13.4. Between each other, the two differential pistons are supported by intermediate springs 14. Likewise here, the support spring 11 supports the last differential piston relative to the reservoir housing 9. In the present embodiments, the differential chambers 8.1 and 8.2 are interconnected by intermediate channel 15.1. The differential chamber 8.2 connects via a flow control channel, i.e., intermediate channel 15.2 to the differential chamber 8.3 that also accommodates the intermediate springs. The differential chamber 8.3 connects to the differential chamber 8.4 via an intermediate channel 15.3. An intermediate channel 15.4 interconnects the differential chamber 8.4 and the sensor chamber 7. As previously described, these intermediate channels are also here not needed, when a corresponding pressure difference between a pressure being measured and a measured pressure is considered in the calibration.

The embodiments of FIGS. 5 and 6 differ in that in FIG. 5 facing piston sections 13.2 and 13.3 have the same diameter, whereas in the embodiment of FIG. 6, there is one more time a change to the smaller cross section between the piston sections 13.2 and 13.3. This results in a further reduction of the mechanical pressure transmission.

In the embodiments of FIGS. 7 and 8, the partition consists, as has also been described with reference of the embodiments of FIGS. 5 and 6, of a plurality to intermediate pistons 13.1–13.3, which have however the same diameter. It should be noted that the intermediate piston that defines the intermediate reservoir 8.1 may also be a differential piston as has been described in the foregoing.

The resultant intermediate reservoirs 8.1, 8.2 as well as the sensor chamber 7 are interconnected by intermediate channels 15.1–15.3 that are provided in the intermediate pistons, so that a pressure transmission also occurs hydraulically. For a circumferential sealing, standard sealing rings 16 are used, which are inserted into grooves provided in the casing surface of the intermediate pistons. The present embodiment uses rubber bodies as support spring 11 and intermediate springs 14. These rubber bodies may have any shape. The advantage lies in that rubber has also excellent damping characteristics. Preferably, the bodies are rubber rings that are inserted into annular grooves 18 provided in the face end of the one piston, and which are pressed into the groove by an annular bead 19 on the face of the respectively other piston. This results in a spring system with a very high constant of elasticity. The short travels of the spring system account for the circumstance that also the partitions or piston sections are subjected to only little movements in the case of pressure changes and pressure fluctuations in particular.

Likewise the embodiment of FIG. 8 uses a plurality of intermediate pistons 13.1–13.3 of the same cross section. One and the same ring 20 is used for frictional engagement on the circumference and mutual elastic support as well as elastic support relative the reservoir housing 9. The two forward rings 20 are inserted respectively between two opposite faces of two adjacent pistons and radially held by an annular support rim 21 on one of the faces or both faces. The support rims do not touch, so that the rings 20 are subjected to the pressures in the intermediate reservoirs 8.1, 8.2, etc. This causes the rings to expand outward and to provide on the one hand the desired frictional force and frictional resistance to the piston movement and on the other hand the necessary hydraulic sealing. The same applies to the ring 20 that is closest to the sensor element 5 and is used as support spring relative the equalizing reservoir 9.

Many modifications and other embodiments of the inventions set forth herein will come to mind to one skilled in the art to which this invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A hydraulic fluid pressure sensor for measuring the pressure of a hydraulic fluid in a pressure chamber, comprising a reservoir housing including a peripheral wall which is connected to the pressure chamber, a partition dividing the interior of the reservoir housing into a reservoir chamber formed on the side of the partition facing the pressure chamber and a sensor chamber on the opposite side of the partition, a throttle passage formed between the interior of the pressure chamber and the reservoir chamber so that hydraulic fluid in the pressure chamber can flow from the pressure chamber into the reservoir chamber, a sensor element connected to communicate with the sensor chamber of the reservoir housing, and said partition comprising a piston which is mounted in the reservoir housing for sliding movement along the interior of the peripheral wall of the reservoir housing so as to generate a frictional force therebetween, and a support spring disposed in the interior of the sensor chamber for biasing the piston in a direction toward the reservoir chamber.

2. The hydraulic fluid pressure sensor of claim 1, wherein the partition comprises a differential piston comprising piston sections having cross sections that enlarge in steps in a direction moving away from the pressure chamber, and with the reservoir housing being divided into corresponding housing sections whose cross sections correspond to the cross sections of the respective piston sections, wherein the piston sections are disposed in the housing sections in a sliding and sealing manner, wherein the housing section with the smallest diameter is located closest to the pressure chamber and communicates with the pressure chamber via the throttle passage, and wherein the remaining housing sections communicate with the pressure chamber via the throttle passage and one or more flow control channels.

3. The hydraulic fluid sensor of claim 2, wherein the piston sections form an integral one-piece unit.

4. The hydraulic fluid sensor of claim 2, wherein each piston section is sealed relative to the wall of the reservoir housing by a sealing ring arranged in a circumferential groove in the piston section and mounted for sliding movement along the interior wall of the reservoir housing while exerting a frictional force.

5. The hydraulic fluid sensor of claim 2 wherein the one or more flow control channels extend through at least one of the piston sections.

6. The hydraulic fluid sensor of claim 2 wherein the housing section furthest from the pressure chamber communicates with the sensor chamber via a flow channel through the intermediate piston section.

7. The hydraulic fluid sensor of claim 1, wherein the partition comprises two or more piston sections which are not interconnected and so as to permit the piston sections to move independently of each other in a sliding and sealing manner, with an intermediate spring interposed between each adjacent pair of the piston sections and so that the adjacent piston sections form an intermediate chamber section which is connected to the pressure chamber via the throttle passage and one or more flow control channels.

8. The hydraulic fluid sensor of claim 7, wherein the one or more flow control channels extend through at least one of the piston sections.

9. The hydraulic fluid sensor of claim 7 wherein the support spring and/or each intermediate spring are formed by an elastic body.

10. The hydraulic fluid sensor of claim 7, wherein each intermediate spring comprises an annular elastic ring retained in an annular groove in at least one of the piston sections for mutually supporting two adjacent piston sections, and wherein the other piston section engages the elastic ring with an annular bead that corresponds to the size of the annular groove.

11. The hydraulic fluid sensor of claim 7 wherein each piston section is sealed relative to the wall of the reservoir housing by a sealing ring arranged in a circumferential groove in the piston section and mounted for sliding movement along the interior wall of the reservoir housing while exerting a frictional force.

12. The hydraulic pressure sensor of claim 7 wherein the piston sections are of the same diameter and wherein each intermediate spring comprises an elastic ring which has essentially the same diameter or a somewhat larger diameter than the piston sections.

13. The hydraulic pressure sensor of claim 12 wherein each of the elastic rings which form the intermediate springs is supported between cooperating annular support rims positioned respectively on the opposing faces of the piston sections.

* * * * *